United States Patent [19]
Hirashma

[11] Patent Number: 5,455,860
[45] Date of Patent: Oct. 3, 1995

[54] SCRAMBLE CODEC

[75] Inventor: Masayoshi Hirashma, Ibaraki, Japan

[73] Assignee: Matsushita Electric Industrial Co., Ltd., Osaka, Japan

[21] Appl. No.: 48,791

[22] Filed: Apr. 16, 1993

[30] Foreign Application Priority Data

Apr. 17, 1992 [JP] Japan .................... 4-125583

[51] Int. Cl.⁶ .................... H04N 7/167
[52] U.S. Cl. .................... 380/5; 380/14; 380/19
[58] Field of Search .................... 380/14, 19, 5

[56] References Cited

U.S. PATENT DOCUMENTS

| | | |
|---|---|---|
| 4,070,693 | 1/1978 | Shutterly . |
| 4,547,802 | 10/1985 | Fogarty et al. . |
| 4,680,791 | 7/1987 | Kato et al. . |
| 4,682,360 | 7/1987 | Frederiksen .................... 380/10 |
| 4,723,282 | 2/1988 | Marie et al. .................... 380/14 |
| 4,905,278 | 2/1990 | Parker .................... 380/7 |
| 5,058,159 | 10/1991 | Quan .................... 380/19 |
| 5,091,938 | 2/1992 | Thompson et al. . |
| 5,243,650 | 9/1993 | Roth et al. .................... 380/19 |

FOREIGN PATENT DOCUMENTS

| | | |
|---|---|---|
| 0119945 | 9/1984 | European Pat. Off. . |
| 0143896 | 6/1985 | European Pat. Off. . |
| 0179612 | 4/1986 | European Pat. Off. . |
| 0212223 | 3/1987 | European Pat. Off. . |
| 2541841 | 8/1984 | France . |
| 90/12471 | 10/1990 | France . |
| 57-023367 | 2/1982 | Japan . |
| 2067871 | 7/1981 | United Kingdom . |

OTHER PUBLICATIONS

Kazuo Kitagawa et al., An Encrypted Audio System for Conventional Cable System, 1985 IEE International Conf. on Consumer Electronics, Jun. 7, 1985.

Primary Examiner—Stephen C. Buczinski
Attorney, Agent, or Firm—Ratner & Prestia

[57] ABSTRACT

A scramble codec comprises a nonvolatile key data memory which holds a key data varying from one video recorder to another, a pair of line memories in which input picture signals are alternately written for each horizontal scan line, a nonlinear feedback shift register which is initialized with the output of the key data memory to output dissimilar pseudorandum pulse signals for respective horizontal scan lines, an address setting circuit which sets, as the initial value for scrambling, a value corresponding to the output of the nonlinear feedback shift register and, as the initial value for descrambling, a value obtained by subtracting the output of the nonlinear feedback shift register from the maximum address value of each line memory and an address counter which generates a consecutive series of addresses beginning with the address set by the above address setting circuit and applies a signal for each horizontal scan line alternately to the pair of line memories.

27 Claims, 8 Drawing Sheets

THIS TAPE WAS RECORDED WITH
VTR MACHINE NO. 1234-5678-90

FIG. 5

SCRAMBLE CODEC

BACKGROUND OF THE INVENTION

The present invention relates to a scramble codec which can be used for securing information such as television signals which are transmitted by transmission systems that can be easily tapped by others or information such as that photographed with a video camera which must be secured from disclosure to others. More particularly, the invention relates to a video recorder which includes a scramble codec.

The recent development of various communication media and new recording media such as optical disks has made it feasible to transmit data and information with a remarkably expanded coverage and at amazing speeds. On the other hand, the same technology has made it an easy chore to tap such data communications systems, making it increasingly difficult to insure the privacy of information. By way of illustration, it is by now the order of the day that corporate proprietary information is transmitted via. communication satellites, data including confidential business information are communicated by way of video conferences, or the data generated in experiments performed in private laboratories are recorded on the video type recorder (hereinafter abbreviated as VTR), optical disk or other recording medium for subsequent reproduction and use. Many of such data, pictures and voices are desirably concealed from third persons. In order to secure such information, a scramble encoder is generally employed. However, the conventional scramble encoders demand a large-scale encoding system and encoder and do not allow us to secure information in an easy manner. Thus, there has not been available a device by which confidential information could be conveniently recorded on VTR, for instance, and the recorded information be easily reproduced with security retained and this has been an obstacle to the transmission of confidential data and information.

Presented in FIG. 8 is a block diagram showing the basic construction of the conventional scramble encoder. As shown, the reference numeral 101 represents a computer (hereinafter abbreviated as CPU) which controls the entire scramble encoder. Depending on the system scale, a variety of CPUs from a personal computer to a large universal computer are employed. The picture signal and sound signal are applied to a picture scrambler 102, which scrambles the picture signal, and a sound scrambler 103, which scrambles the sound signal, respectively. A key signal generating circuit 104 generates a key signal which is synchronized with the picture signal. A superimposing circuit 105 superimposes this key signal on the picture signal scrambled by the picture scrambler 102. The sound signal is FM-modulated by an FM modulating circuit 106 and a mixing circuit 107 mixes it with the scrambled picture signal to provide a scrambled composite video signal.

The principle of operation of a scramble encoder is now explained. While many systems can be contemplated and used for the picture scrambler 102, a scrambling technology which is known as line rotation in which the picture signal scan line is cyclically shifted is explained here. This line rotation processing comprises setting a cutting point for shifting the picture signal scan line at x on the CPU 1, coding this cutting point x using the key signal (Kj) and forming this coded X into a binary signal in the key signal forming circuit within the vertical retrace period. For scrambling the sound signal, the sound signal is A/D converted and encoded by adding a pseudorandom signal (hereinafter abbreviated as PN signal). And only the initial value of this PN signal is superimposed and transmitted.

At the receiving end which received the above signal, the signal can be descrambled by executing the reverse of the encoding procedure. Taking the descrambling of the sound signal as an example, the initial value of PN is applied to a PN generating circuit to generate a PN signal series for descrambling and a demodulation to the original signal is performed according to this PN signal series. For the descrambling of the picture signal, the read position (corresponding to the cutting point in scrambling) is logically determined from the initial value of PN transmitted every field or in a predetermined cycle. The algorithm for the above determination procedure is not disclosed for enhanced security.

However, since the conventional scramble encoder and encoder are bulky and costly, they could not be easily built into the television receiver and the home VTR. Therefore, only the descrambler was miniaturized and used as connected to the television receiver. However, this requires an additional space and an additional expenditure.

SUMMARY OF THE INVENTION

A video recorder is disclosed having a built-in scramble encoder-decoder which is of reduced size and, thus, being capable of recording and reproducing secured information.

The video recorder according to an exemplary embodiment of the present invention includes a scramble codec for scrambling and descrambling television picture signals, the scramble codec comprising a nonvolatile key data memory which stores key data varying from one video recorder to another, a pair of line memories in which the input picture signal is alternately written for each horizontal scan line, a nonlinear feedback shift register in which the output of the nonvolatile key data memory which stores key data is set as the initial value and which outputs dissimilar pseudorandom pulse signals for respective horizontal scan lines, an address setting circuit which sets, as the initial value, a value corresponding to the output of the nonlinear feedback shift register in scrambling and a value arrived at by subtracting the output of the nonlinear feedback shift register from the maximum address value of the memory in descrambling, and an address counter which generates a consecutive series of addresses starting from the address set by the address setting circuit and supplies to the pair of line memories for each horizontal scan line independently.

It may be so arranged that the address setting circuit sets, as the initial value, the value obtained by subtracting the output of the nonlinear feedback register from the maximum address value of the line memory for scrambling and a value corresponding to the output of the nonlinear feedback shift register for descrambling.

For a further improvement in security function, a further exemplary embodiment of the present invention further provides a video recorder scramble codec which further comprises a latch means for holding an ID number and an EOR circuit which takes the exclusive logical sum of the ID number held by the latch means and the output of the key data memory, the output of the EOR circuit being set as the initial value in the nonlinear feedback shift register which outputs dissimilar pseudorandom pulse signals for respective horizontal scan lines. It is also possible to provide an input means which can be used for changing the ID number for added security.

A further exemplary embodiment of the present invention further provides a video recorder including a scramble codec which can be used in the scrambling and descrambling of both the picture and sound components of a television signal composed of a picture signal and a sound signal, the scramble codec comprising a nonvolatile key data memory which stores key data varying from one video recorder to another, a pair of line memories in which the input picture signal is alternately written for each horizontal scan line, a nonlinear feedback shift register in which the nonvolatile key data memory which stores key data is set as the initial value and which outputs dissimilar pseudorandom pulse signals for respective horizontal scan lines, an address setting circuit which sets, as the initial value, a value corresponding to the output of the nonlinear feedback shift register in scrambling and a value arrived at by subtracting the output of the nonlinear feedback shift register from the maximum address value of the line memories in descrambling, an address counter which generates a consecutive series of addresses starting from the address set by the address setting circuit and supplies a read signal alternately to the pair of memories for each horizontal scan line independently, a conversion circuit which converts an input analog sound signal to a serial bit stream signal in scrambling, a demodulating circuit which demodulates the sound signal from the composite video signal to a bit stream in descrambling, a sound PN generating circuit which generates sound pseudorandom pulse signals, a first EOR circuit which takes the exclusive logical sum of the output of the sound PN generating circuit and the sound signal converted to the bit stream, a modulating circuit which modulates the output of said first EOR circuit in scrambling, a mixing circuit which mixes the modulated signal with the picture signal, and a PCM demodulating circuit which demodulates the output of the first EOR circuit to the original analog signal in descrambling.

For use as a scrambler-descrambler for sound signals only, the scramble codec of an exemplary embodiment of the present invention can be constituted as a device comprising a conversion circuit which converts an input analog sound signal to a serial bit stream signal in scrambling, a demodulating circuit which demodulates the sound signal from the composite video signal to a bit stream in descrambling, a sound PN generating circuit which generates sound pseudorandom pulse signals, a first EOR circuit which takes the exclusive logical sum of the output of the sound PN generating circuit and the sound signal converted to the bit stream, a modulating circuit which modulates the output of the first EOR circuit in scrambling, a mixing circuit which mixes the signal modulated by the modulating circuit with the picture signal, and a PCM demodulating circuit which demodulates the output of the first EOR circuit to reproduce the original analog signal in descrambling.

The degree of security of this device can be improved by arranging so that the output of a nonvolatile data memory storing a key data exclusive to each individual video recorder is used to initialize the sound PN generating circuit. For a further improvement in security function, the present invention further provides a video recorder including a scramble codec which further comprises a latch means for holding a ID number, a second EOR circuit which takes the exclusive logical sum of the ID number held by the latch means and the output of the key data memory, the output of the second EOR circuit being set as the initial value in the nonlinear feedback shift register which outputs dissimilar pseudorandom pulse signals for respective horizontal scan lines and the output of this second EOR circuit being set as the initial value in the sound PN generating circuit to provide pseudorandom pulse signals for the analog signal.

Still further improvement in the degree of security can be achieved when the video recorder of an exemplary embodiment of the present invention is further provided with a message memory for storing an intrinsic data specifying the particular video recorder as a picture data and a message inserting circuit which in the recording mode reads data from the message memory and inserts the data into the picture signal.

The video recorder of an exemplary embodiment of the present invention performs both scrambling and descrambling using a single scramble codec. In scrambling, the nonlinear feedback shift register initialized by the output of the key data memory outputs dissimilar pseudorandom pulse signals for respective horizontal scan lines. A signal corresponding to the output of the nonlinear feedback shift register is set as the initial value in an address counter by an address setting circuit. Starting from the address set by the address counter, a consecutive series of addresses are generated and the picture signals alternately written in the pair of line memories are alternately read out by applying a signal to the pair of line memories for each horizontal scan line independently to thus execute a line rotation. By reading signals from positions varying from one horizontal scan line to another, the picture signal is scrambled. The picture signal thus scrambled is recorded or reproduced.

In descrambling, the pair of line memories are loaded in the same manner as above. Since the address setting circuit has set the value obtained by subtracting the output of the nonlinear feedback shift register from the maximum address value of each line memory as the initial value, the address counter accordingly generates a consecutive series of addresses starting from the set address and reads out the picture signal written alternately into the line memories by applying an address signal alternately to the line memories for each horizontal scan line independently so as to reproduce the original signal. In this manner, the picture signal can be descrambled in the same way to decode the scrambled data signals recorded on a recording medium such as a tape.

Of course, the same effect can be achieved by so arranging that the address setting circuit sets, as the initial value, the value obtained by subtracting the output of the nonlinear feedback shift register from the maximum address value of each line memory for scrambling and a value corresponding to the output of the nonlinear feedback shift register for scrambling.

When the signal is a composite signal composed of a picture signal and a sound signal, the picture signal is processed in the same manner and the sound signal is scrambled by converting it to a bit stream signal and taking the exclusive logical sum of the bits stream signal and the output of the sound PN generating circuit before mixing with the picture signal. For descrambling, the extracted signal is converted to a bit stream signal and the exclusive logical sum with the output of the same sound PN generating circuit is taken to scramble and convert the signal to an analog signal output.

When the scramble codec further includes a latch means for holding an ID number and an EOR circuit for calculating the exclusive logical sum of the ID number held by the latch means and the output of the key data memory, the data signal can be recorded and reproduced only with a video recorder having the same latch means and the same ID number. Thus, the key data is detected and compared with the key data stored in the key data memory and the exclusive logical sum of the ID number and the output of the key data memory is taken in the EOR circuit and outputted. The output of the EOR circuit is set as the initial value for the nonlinear feedback shift register which accordingly outputs dissimilar pseudorandom pulses for respective horizontal scan lines. Therefore, scrambling or descrambling is carried out as described above. Added security can be assured with the provision of an input means by which the ID number can be freely altered.

The message data specifying the particular video recorder is stored as picture data and in the recording made this picture data is recorded unscrambled in the video recorder. Therefore, in reproduction, the specific video recorder can be identified with certainty by reading the message indicating the machine number or the like.

BRIEF DESCRIPTION OF THE DRAWINGS

FIG. 5 is a pattern diagram showing an exemplary display of message data such as "the message containing the characters representing the machine identification number" in the above exemplary embodiment.

DETAILED DESCRIPTION OF THE INVENTION

The present invention is now described with reference to the accompanying drawings illustrating preferred embodiments.

Figure 1:
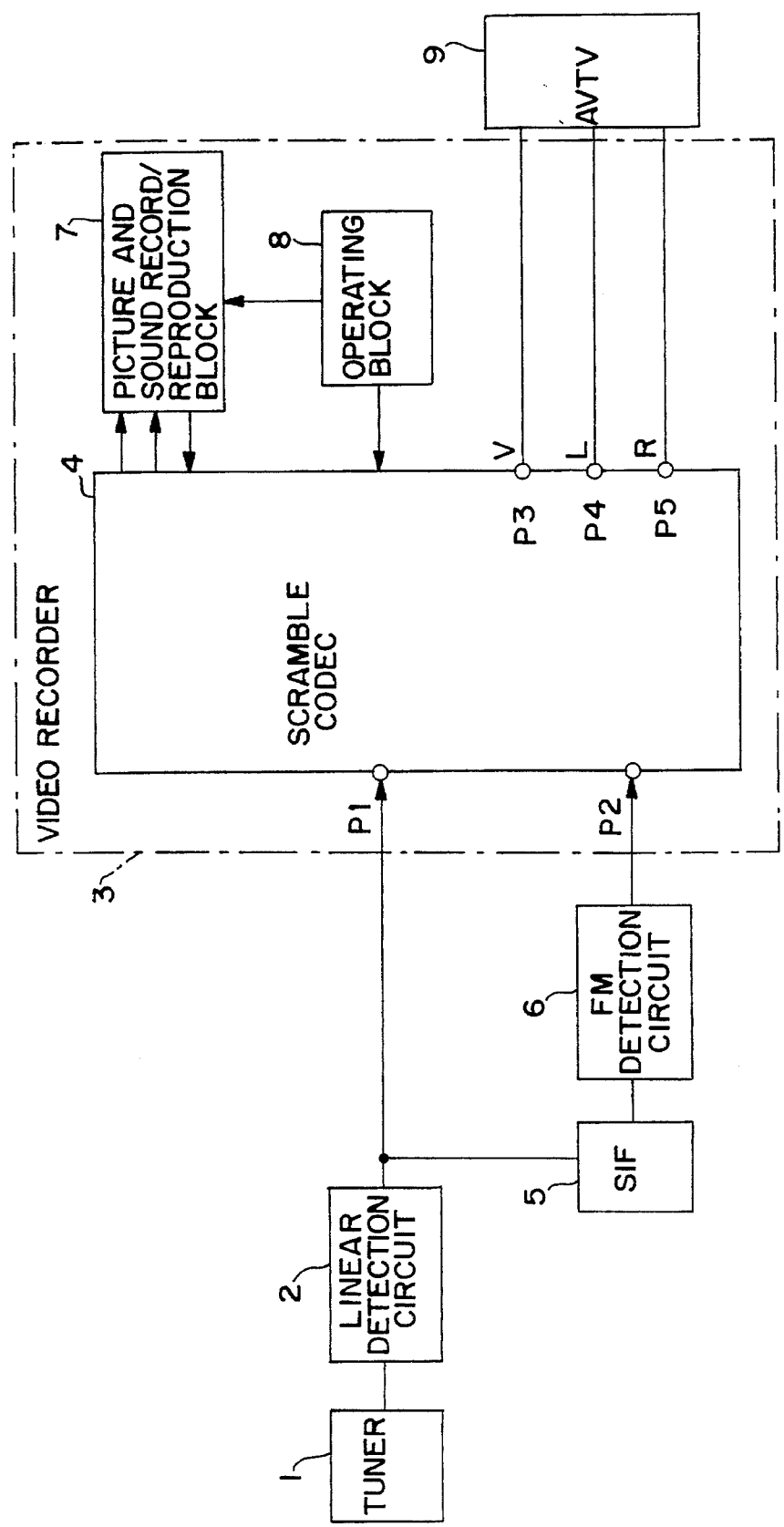
FIG. 1 is a block diagram showing a video recorder embodying the principles of an exemplary embodiment of the invention.

Referring to FIG. 1, which is a block diagram showing a video recorder in accordance with an exemplary embodiment of the present invention its peripheral circuitry for the recording and reproduction of a composite signal composed of a picture signal and a sound signal, a tuner 1 is a television receiver in which the received signal is applied to a linear detection circuit 2 for detection of the picture signal. The signal detected by the linear detection circuit is the so-called NTSC signal which is a composite signal obtained by the frequency-multiplexing of the 4.5 MHz carrier modulated by the sound signal with the picture signal and this NTSC signal is applied to an input terminal P1 of a scramble codec 4 built into the video recorder 3 of this embodiment. Moreover, the same signal is converted to a sound signal through a sound intermediate frequency (SIF) circuit 5 and an FM detection circuit 6 and applied to an audio input terminal P2 of the scramble codec 4. The video recorder 3 comprises the scramble codec 4, a picture and sound record/reproduction block 7 and an operating block 8. The scramble codec 4 outputs the picture signal V from a terminal P3, while the left and right channel sound signals are outputted from terminals P4 and P5, respectively. These terminals are connected to a monitor AVTV 9.

The scramble codec 4 of the video recorder 3 is a circuit which functions not only as a scrambler for scrambling the picture and sound signals but also as a descrambler for decoding these scrambled signals. The picture and sound record/reproduction block 7 is a record/reproduction circuit which records picture and sound signals on a VTR or optical disk and reproduces them. The recordable picture signal frequency range is up to 6 MHz.

Figure 2:
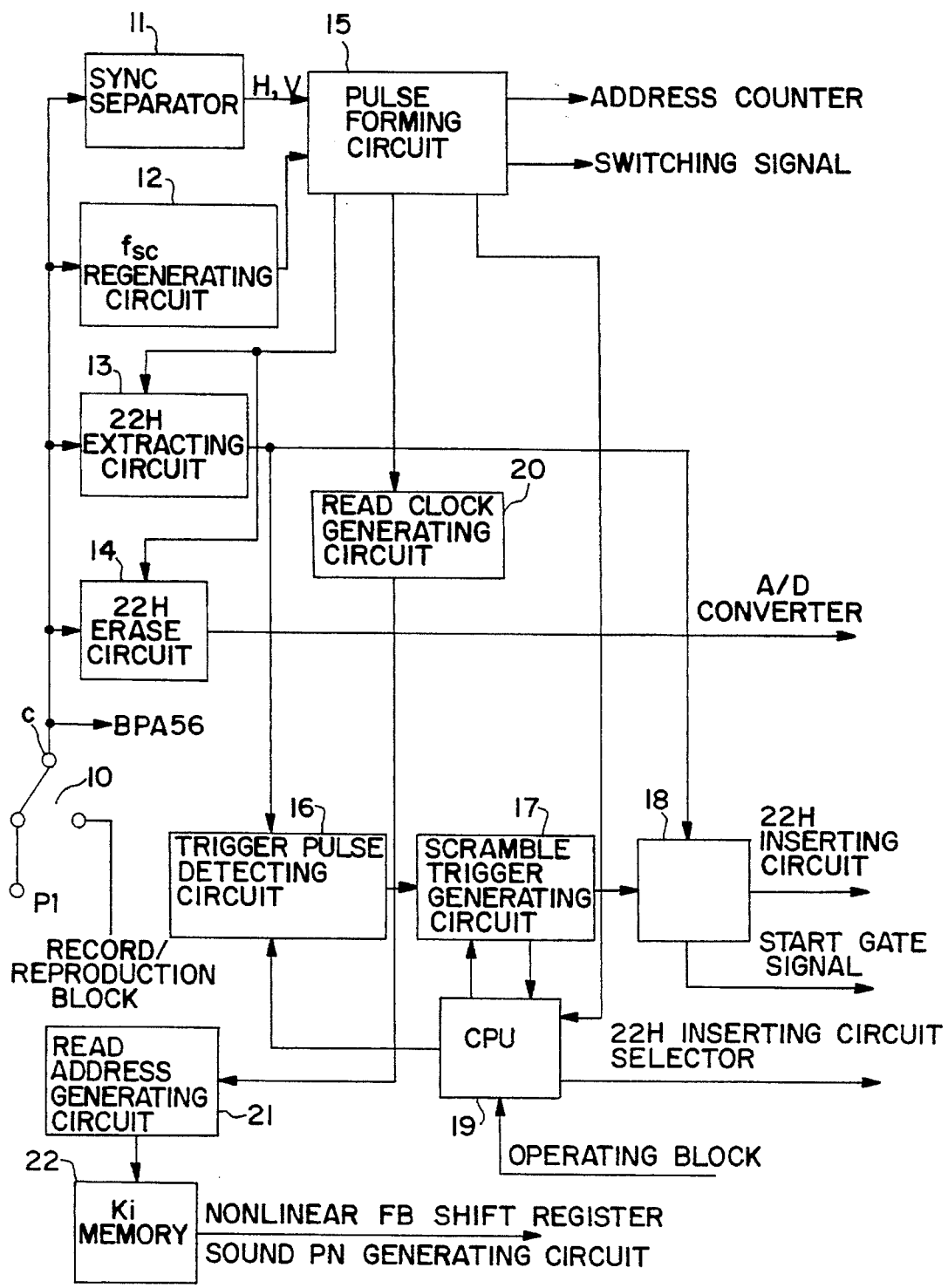
FIG. 2 is a partial block diagram showing an exemplary scramble codec built into the above video recorder.

An exemplary construction of this scramble codec 4 is now described with reference to FIGS. 2 through 4. FIG. 2 is a block diagram showing the picture signal processing block of the scramble codec. Indicated at 10 is a switch for selection of the record mode or the reproduction mode and its common contact c is switched to the input terminal P1 for recording or to the output of the picture and sound record/reproduction block 7 shown in FIG. 1 for reproduction. Connected to this common terminal c of switch 10 are a sync separator 11, a $f_{sc}$ regenerating circuit 12, a 22 H extraction circuit 13 and a 22 H erase circuit 14. The sync separator 11 is adapted to separate the horizontal synchronizing signal H and the vertical synchronizing signal V and its output is applied to a pulse forming circuit 15. The pulse forming circuit 15 supplies a clock signal and gate pulses to various parts of the system. The $f_{sc}$ generating circuit 12 regenerates the chrominance subcarrier ($f_{sc}$) and forms a 4 $f_{sc}$ clock signal which is applied to the pulse forming circuit 15. The 22 H extraction circuit 13 and 22 H erase circuit 14 are circuits which extract and erase the picture signal of the 22nd horizontal scan line (hereinafter referred to briefly as 22 H), respectively. The extracted 22 H signal is applied to a trigger pulse detecting circuit 16. The trigger pulse detecting circuit 16 extracts the trigger pulse representing the start of scrambling from the signal superimposed on the picture signal component of the 22nd horizontal scan line and its output is fed to a scramble trigger generating circuit 17. The scramble trigger generating circuit 17 is a circuit which generates a scramble trigger signal in scrambling and its output is supplied to a delay circuit 18. When the signal is a non-scrambled signal, the delay circuit 18 delays not only the 22 H signal extracted by the 22 H extraction circuit 13 but also the scramble trigger from the scramble trigger generating circuit 17.

A CPU 19 is connected as a controller for controlling the actions of various parts of this scramble codec 4. The CPU 19 performs such control operations based on the input signal from the operating block 8 shown in FIG. 1. The output of the pulse forming circuit 15 is applied to a read clock generating circuit 20. The read clock generating circuit 20 applies a clock signal to a read address generating circuit 21. The output terminal of this read address generating circuit 21 is connected to a Ki memory 22. The Ki memory 22 is a nonvolatile key data memory which stores a key data exclusive to the particular scramble codec. This key data is comprised, for example, of 64 bits. Of the 64 bits, 8 bits may be used as parity bits. The data read from the Ki memory 22 is applied, as the initial value, to a nonlinear feedback shift register 31 shown in FIG. 3 and to a sound PN generating circuit 51 which is shown in FIG. 4.

Figure 3:
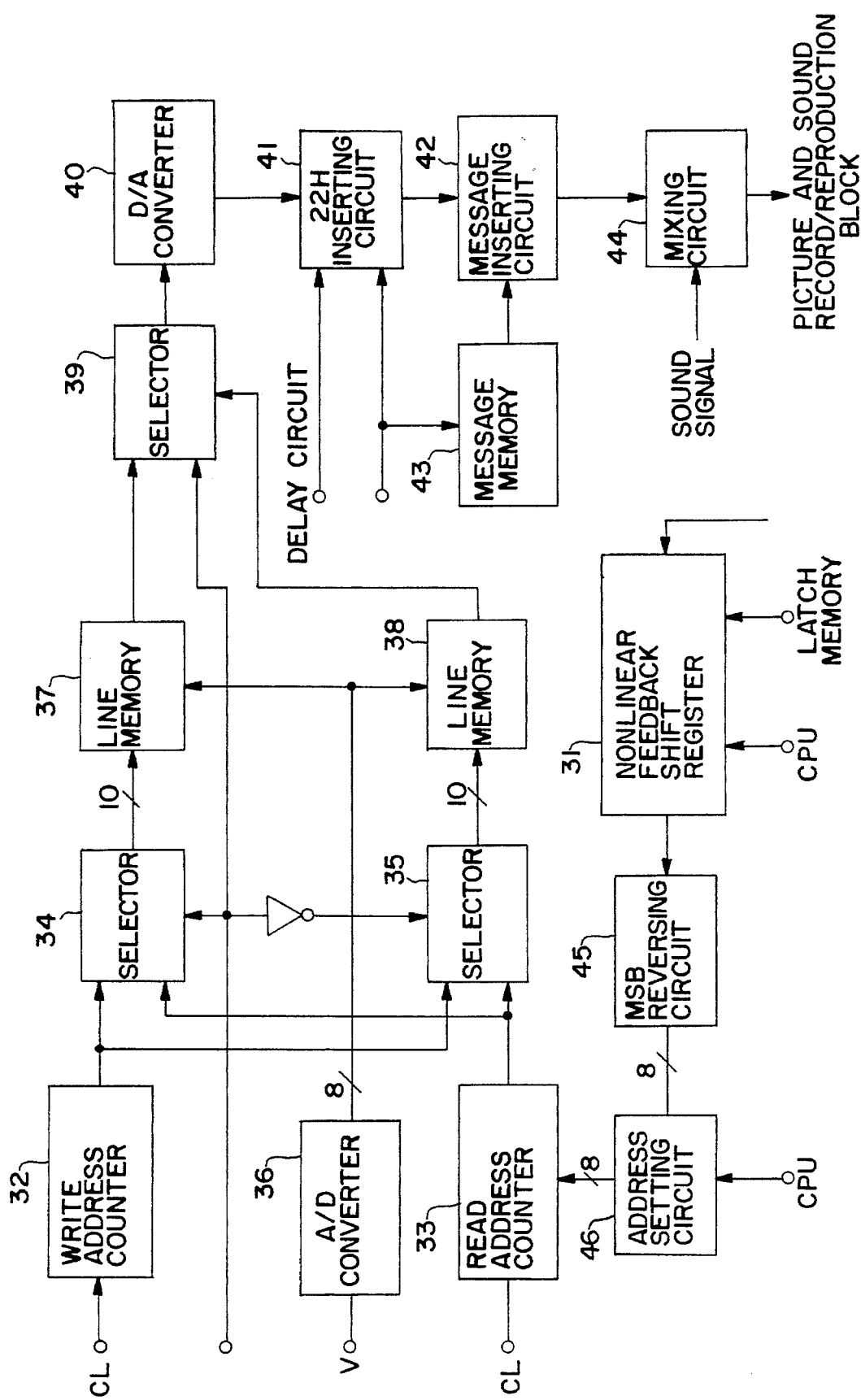
FIG. 3 is a block diagram showing the picture signal processing block of the same exemplary scramble codec.
Figure 4:
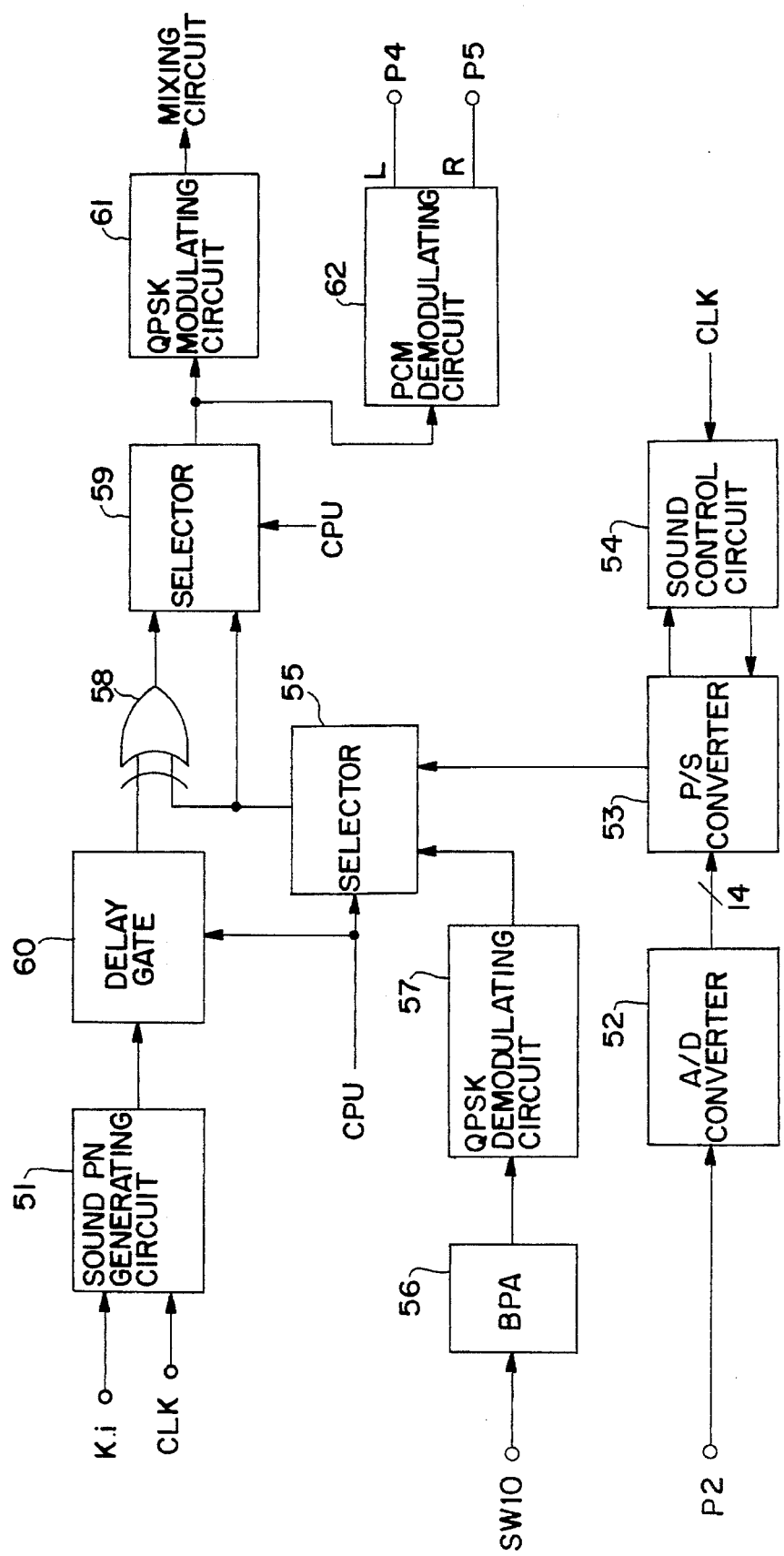
FIG. 4 is a block diagram showing the sound signal processing block of the same exemplary scramble codec.

FIG. 3 is a block diagram showing the section of scramble codec 4 where the picture signal is scrambled and descrambled. As shown, the 4 $f_{sc}$ clock signal from the pulse forming circuit 15 shown in FIG. 2 is applied to a write address counter 32 and a read address counter 33. These address counters count the input clocks and their parallel outputs are fed to selectors 34 and 35, respectively. The picture signal from which 22 H has been eliminated by the 22 H erase circuit 14 is applied to an A/D converter 36. The A/D converter 36 is a device which converts an analog picture signal to a digital signal and its output is applied to line memories 37, 38. The selectors 34 and 35 are supplied with gate signals synchronized with the horizontal synchronizing signal H from the pulse forming circuit 15 and apply a write address and a read address alternately to said line memories 37, 38. Each of the line memories 37, 38 is a memory which stores 744 picture signal dots per horizontal scan line in 8 bits. The line memories 37, 38 are used in writing data in the write address from the write address counter 32 which is selected by the selectors 34, 35 and reading data from the read address set by the read address counter 33 which is also selected by selectors 34, 35. A selector 39 is synchronized with selectors 34, 35 and selects the read signal. The output of the selector 39 is applied to a D/A converter 40. The D/A converter 40 converts the selected signal to an analog signal and its output is applied to a 22 H inserting circuit 41. To the 22 H inserting circuit 41 is applied the picture signal of the 22nd horizontal scan line through the delay circuit 18. The 22 H inserting circuit 41 aligns the scramble trigger pulse of the 22nd horizontal scan line removed by the 22 H erase circuit 14 with the picture frame signal and sound frame signal and inserts the 22 H in timing into the picture signal. The output of this circuit 41 is applied, as a scrambled signal or a descrambled signal, to a message inserting circuit 42.

A message memory 43 is a memory device which holds information identifying the particular video recorder, which may for example be a machine No., as a picture data and stores the message shown in FIG. 5 by way of example. In descrambling, this message in the message memory 43 is supplied as a picture data to the message inserting circuit 42. The message inserting circuit 42 superimposes this message on the picture signal to form a new picture signal and its output is applied to a mixing circuit 44. The mixing circuit 44 mixes this picture signal with the modulated FM sound signal and its output is fed to the picture and sound record/reproduction block 7 shown in FIG. 1.

The nonlinear feedback shift register 31 may, for example, be the circuit of FIG. 5 included in the supplement to Ministry of Posts and Telecommunications Notification No. 53 published in the Official Gazette (Special Issue No. 7) of Jan. 25, 1990 incorporated herein by reference. The output of this nonlinear feedback shift register 31 is used to determine the cut-point for each horizontal scan line in the line rotation system. Since the maximum available number of such cut-points is 186 per H, data of 8 bits are used and for 186 and higher values, MSB is reversed. An MSB reversing circuit 45 reverses the MSB in response to the above output and its output n (=0~185) is applied to an address setting circuit 46. The address setting circuit 46 is adapted to calculate and set the initial value of read address for each horizontal scan line in such a manner that the value will be equal to 4n for scrambling and, assuming that the maximum value of read address is 774, equal to 774−4n for descrambling. The reverse, viz. 774−4n for scrambling and 4n for descrambling, can also be adopted.

The block which performs sound signal scrambling and descrambling is now described with reference to FIG. 4. First, the sound signal input terminal P2 is connected to the input terminal of the A/D converter 52. The A/D converter 52 is a device which converts an analog sound signal to a 14-bit digital signal and its output is applied to a P/S converter 53. The P/S converter 53 converts the input signal to a serial bit stream, to which control information is added from a sound control circuit 54. This serial bit stream is then applied to a selector 55. The A/D converter 52 and P/S converter 53 taken together constitute a conversion circuit for converting an input analog sound signal to a bit stream. On the other hand, the common terminal c of the switch 10 is connected to a bandpass amplifier (hereinafter referred to briefly as BPA) 56 which amplifies the 4.5 MHz signal and its output is applied to a QPSK demodulating circuit 57. The QPSK demodulating circuit 57 outputs the binary signal of 720 KHz as a bit stream to the selector 55. The selector 55 selects either signal according to descrambling or scrambling and applies it to an EOR circuit 58 and a selector 59.

The sound signal processing block has a sound PN generating circuit 51 whose function is comparable to that of the nonlinear feedback shift register 31. While this sound PN generating circuit 51 may be of the same construction as the nonlinear feedback shift register 31, a different circuit is used in this embodiment. Thus, the sound PN generating circuit 51 is a circuit which generates audio pseudorandom (hereinafter referred to briefly as PN) signals and its output is applied to one of the input terminals of the EOR circuit 58 through a delay circuit 60. The EOR circuit 58 has the function to scramble the sound signal or descramble the scrambled sound signal, based on the exclusive logical sum of the sound PN signal and the output of the P/S converter 53 through the delay circuit 60 and its output is fed to the selector 59. The selector 59 selects the output of the selector 55 for the non-scrambled signal in each frame and the output of the EOR circuit 58 for the scrambled signal, and supplies the output to a QPSK modulating circuit 61 in scrambling and to a PCM demodulating circuit 62 in descrambling.

The QPSK modulating circuit 61 modulates this signal and applies it to the mixing circuit 44. The signal applied to the PCM demodulating circuit 62 is converted to a parallel signal and further to an analog signal, thus undergoing PCM demodulation, and its output is connected to the left and right sound output terminals P5, P6 to provide the descrambled signal.

The operation of this exemplary embodiment is now described with reference to the time chart shown in FIG. 6. First, the NTSC signal fed from the tuner or the like to the input terminal P1 is encoded by scrambling and recorded. In this case, a record command signal is applied from the operating block 8 shown in FIG. 1. The time of completion of this input operation is designated $t_{11}$ (cf. Record command signal in FIG. 6.). This signal is transmitted to the CPU 19 shown in FIG. 2. The CPU 19 provides the message memory 43 shown in FIG. 3 with a read address so that the same signal may be read for a predetermined time, whereby a "message containing the characters representing the machine ID no." can be displayed for, say, one minute. The output of this message memory 43 is inserted into the picture signal in the message inserting circuit 42. The display of characters such as this can be easily implemented by the teletext technology commonly employed.

Figure 6:
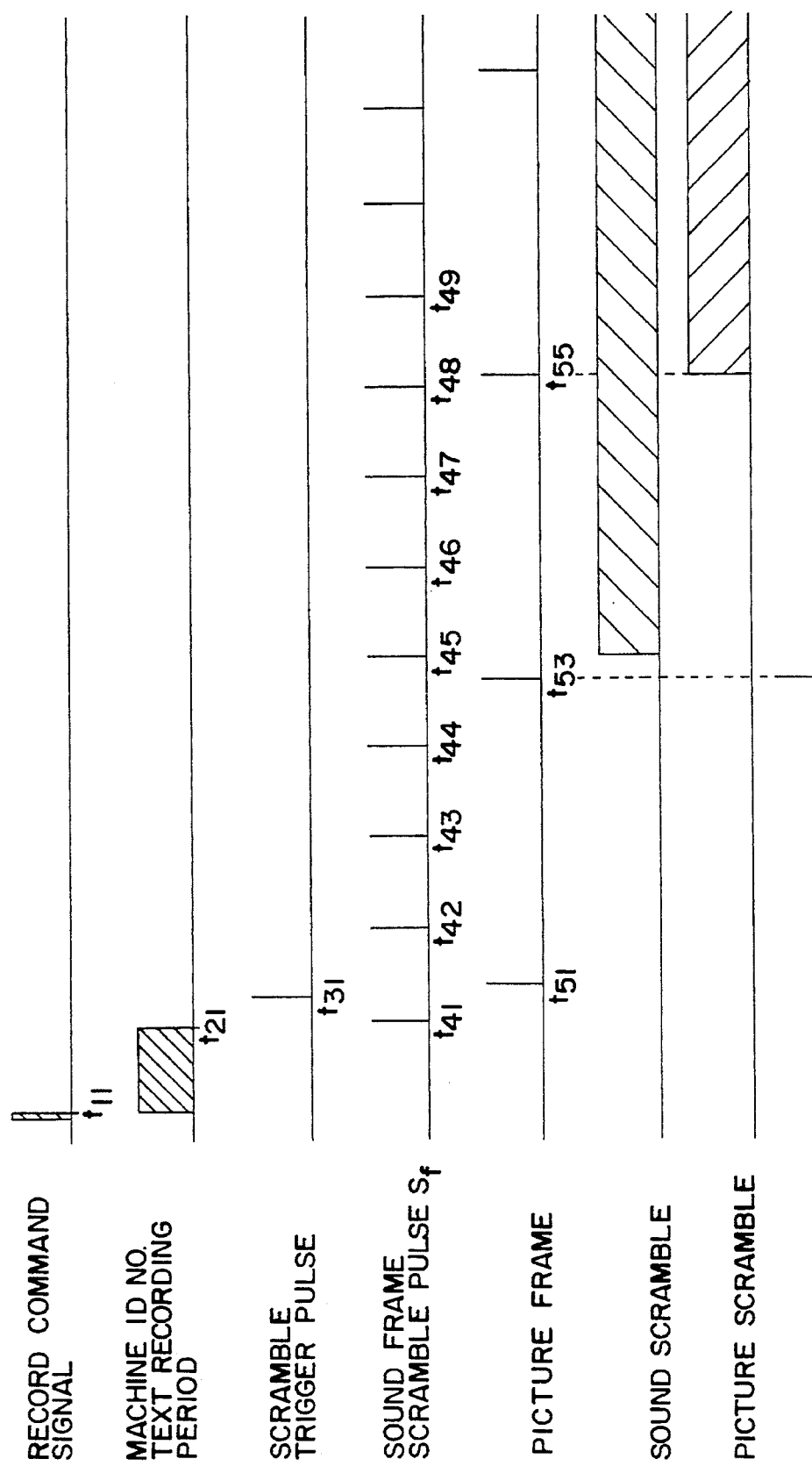
FIG. 6 is a time chart explaining the operation of the same exemplary embodiment.

Referring to FIG. 6, the ID text recording time runs out at time $t_{21}$, which represents completion of the writing of the picture signal containing the text into the recording medium such as a tape. Then, after an appropriate interval, the CPU 19 supplies a clock to the scramble trigger generating circuit 17, which then outputs a 24-bit scramble pulse signal as shown at $t_{31}$ in FIG. 6. This pulse train may be any type of signal but to avoid intermingling with the picture signal, the teletext CR16 bits, for instance, are used in common with the teletext and the frame code is changed, for example, to "11100111". Thus, the entire code, for example, is "1010101010101010111000111". Here, the scramble trigger generating circuit 17 shown in FIG. 2 is constructed as a fuse ROM, which outputs this scramble trigger pulse at a suitable time after $t_{21}$, i.e. the end-point of loading. This scramble trigger is delayed by the delay circuit 18 and inserted into 22 H by the 22 H inserting circuit 41. As mentioned hereinbefore, the delay circuit 18 is designed to delay the scramble trigger for timing it with the sound frame signal supplied every 1 msec and the picture frame signal supplied every 33 msec. Thus, the scramble trigger is delayed to be in time with the 22 H gate pulse, 4 $f_{sc}$ clock pulse and sound frame scramble pulse $S_f$ and inserted in the 22 H. The delay circuit 18 generates a sound scramble start gate signal, which is applied to a delay gate 60. And only when this gate signal is at the high level (Hi), the output of the delay gate 60 becomes equal to the output of the sound PN generating circuit 51 (changed to either 0 or 1). It is assumed, for explanation's sake, that the time relationship of the sound frame signal, picture frame signal and scramble trigger is as illustrated in FIG. 6, that is to say the time $t_{31}$ of the scramble trigger slightly precedes the start $t_{51}$ of the picture frame signal.

First, scrambling of the sound signal is explained. Since the use of pulse code modulation (PCM) is more convenient for sound signal scrambling, it is assumed that PCM is performed and that a system similar to a satellite television broadcasting system is used. However, in order that the composite video signal may be accommodated in a 6 MHz band and the video signal may be recorded by the NTSC signal system using the CATV and wind-band recordable VTR (it is sufficient that the band allows the MUSE signal to be recorded as it is and the band width of the VTR of the SVHS system may be somewhat broadened), the 4.5 MHz carrier is subjected to QPSK with the sound signal (PCM) of 720K bps.

The NTSC sound signal applied to the input terminal P1 of the scramble codec shown in FIG. 1 is simultaneously FM-detected through the SIF 5 and FM detection circuit 6 and applied from the input terminal P2 to the A/D converter 52. When the sound is multiplexed, the left and right channel outputs are applied to the terminal P2. If the output of the video camera or the like has been separated into a picture component and a sound component, the sound component is directly applied to the terminal P2 and in the reception of the broadcast signal, the output of the linear detector 2 is applied to the terminal P1.

In this connection, when one A/D converter is used for stereo 2-channel sound, too, a sample hold circuit is interposed between the A/D converter and the input terminal P2 and the left and right channels are alternately A/D converted. These two channels are sampled at 32 KHz, quantized in 14 bits and subinstantaneously compressed to 10 bits. This is of the same specification as two channels among the 4 channels of the sound A mode of satellite television. The transmission capacity is sufficient if it is 720K bits, which is the sum of 32K×2×10=640K bits, 64K bits for control information and 16 k bits for related information. In satellite television broadcasting, the signal of 2.048 Mbps is subjected to a frequency shift of about ±3.5 MHz by QPSK and transmitted but in a closed loop such as VTR, the frequency shift may be small because the signal degradation is not remarkable. Moreover, since the transmission capacity is only about one-third, the overall frequency shift can be controlled to one-sixth, namely ±600~700 KHz. Therefore, inclusive of the picture signal, a band of 6 MHz is sufficient.

The output of this A/D converter 52 is converted to a serial bit stream by the P/S converter 53 and after addition of the control signal and, if necessary, related information as well from the sound control circuit 54, a digital signal train of 720 k bps is formed and supplied to the EOR circuit 58 through the selector 55.

The generation of the PN signal train is now explained. The Ki memory 22 shown in FIG. 2 stores an exclusive 64-bit key data for each scramble codec, that is to say each video recorder. Of these 64 bits, 8 bits may be used as parity bits. This 64-bit data is read and set as the initial value in the nonlinear feedback shift register 31 shown in FIG. 3 and the sound PN generating circuit shown in FIG. 4. The nonlinear feedback shift register 31 and sound PN generating circuit 51 are each a 32-bit shift register, although a 16-bit register may likewise be employed. Though not shown, this exemplary embodiment may be modified to include an latch means for holding an ID number so that the exclusive logical sum of the output of this latch means and the output f the Ki memory storing the key data is used as the initial value as additional security means. Security against unwanted disclosure such as tapping can be further enhanced by providing an input means by which the ID number can be freely altered.

The clock frequency of the sound PN generating circuit is set at 720 KHz. The nonlinear feedback shift register 31 is shifted by one bit per H to set the address of the read address counter 33. In the sound PN generating circuit 51, a PN signal train of $2^{32}-1$ is generated. Thus, by the delay gate 60, the phase differences among the picture frame, sound frame and scramble trigger pulse are adjusted. And the exclusive logical sum of the sound PN signal output from the delay gate 60 and the PCM modulation signal available through the selector 55 is formed in the EOR circuit 58. The sound signal is thus scrambled, subjected to QPSK modulation by the QPSK modulator 61 through the selector 59 and fed to the mixing circuit 44 shown in FIG. 3.

The processing of the picture signal is now explained. As the picture signal is applied to the input terminal P1, the sync separator 11 separates the horizontal synchronizing signal H and vertical synchronizing signal V and the 22 H erase circuit 14 extracts or erase 22 H. The signal from which 22 H has been erased is applied to the A/D converter 36 shown in FIG. 3.

When the picture signal is not scrambled, the signal input to the A/D converter 36 is converted to an 8-bit digital value and the line memories 37, 38 are written and read alternately. In this case, the signal is delayed by the equivalent of one line and applied to the D/A converter 40 through the selector 39. Into the resulting analog signal is inserted the 22 H through the 22 H inserting signal 41 to provide a video signal.

The scrambling procedure (in the line rotation system) is now described. For line rotation, first the read addresses of the line memories are aligned with the picture signal cut-point. As the cut-point, 8 bits of the output of the nonlinear feedback shift register 31 are employed. Since the maximum cut-point is specified to be ¼ of 744, or 186, in Ministry of Posts and Telecommunications Notification No. 53 published in the Jan. 25, 1990 issue of the Official Gazette (Special Issue 7) which is incorporated herein by reference, MSB is reversed by the MSB reversing circuit 45 for 186 and greater values. The output of the MSB reversing circuit 45 is an 8-bit signal of 0~185 and varies from one line to another. It is now defined as n. In the address setting circuit 46, 4 n is preset before the end of the 22nd H of the input picture signal at terminal P1 (the 21nd H of the output of D/A converter 40). Thus, the operation of 4×n is performed in scrambling. Then, beginning with the start of the 23rd H of the picture signal input to the terminal P1 (the 22nd H at the D/A converter 40), the read address counter 33 counts 4 n, 4 n+1, 4 n+2 . . . and when 744 is reached, returns to 0 and continues to count 1, 2, 3 . . . to 4 n−1. Then, as shown at $\phi_0$ for original signal (23rd H)" in FIG. 7, the data $a_1$–$a_9$ per horizontal scan line written in the line memory 37 are read as $a_4$, $a_5$ . . . $a_9$, $a_0$, $a_1$, $a_2$ and $a_3$ and thus scrambled as shown at $\phi_1$ ("After scrambling (after line rotation)" in FIG. 7). The 24th H signal input during this time is directly written into the line memory 38. After reading of "$\phi_1$ after scrambling" and by the start of reading of the 24th H, the read start signal set in the read address counter 33 has been shifted by a predetermined number of bits and changed to a different figure K, instead of n. The number of bits by which this shift register is shifted per H is determined at the stage of system design.

Figure 7:
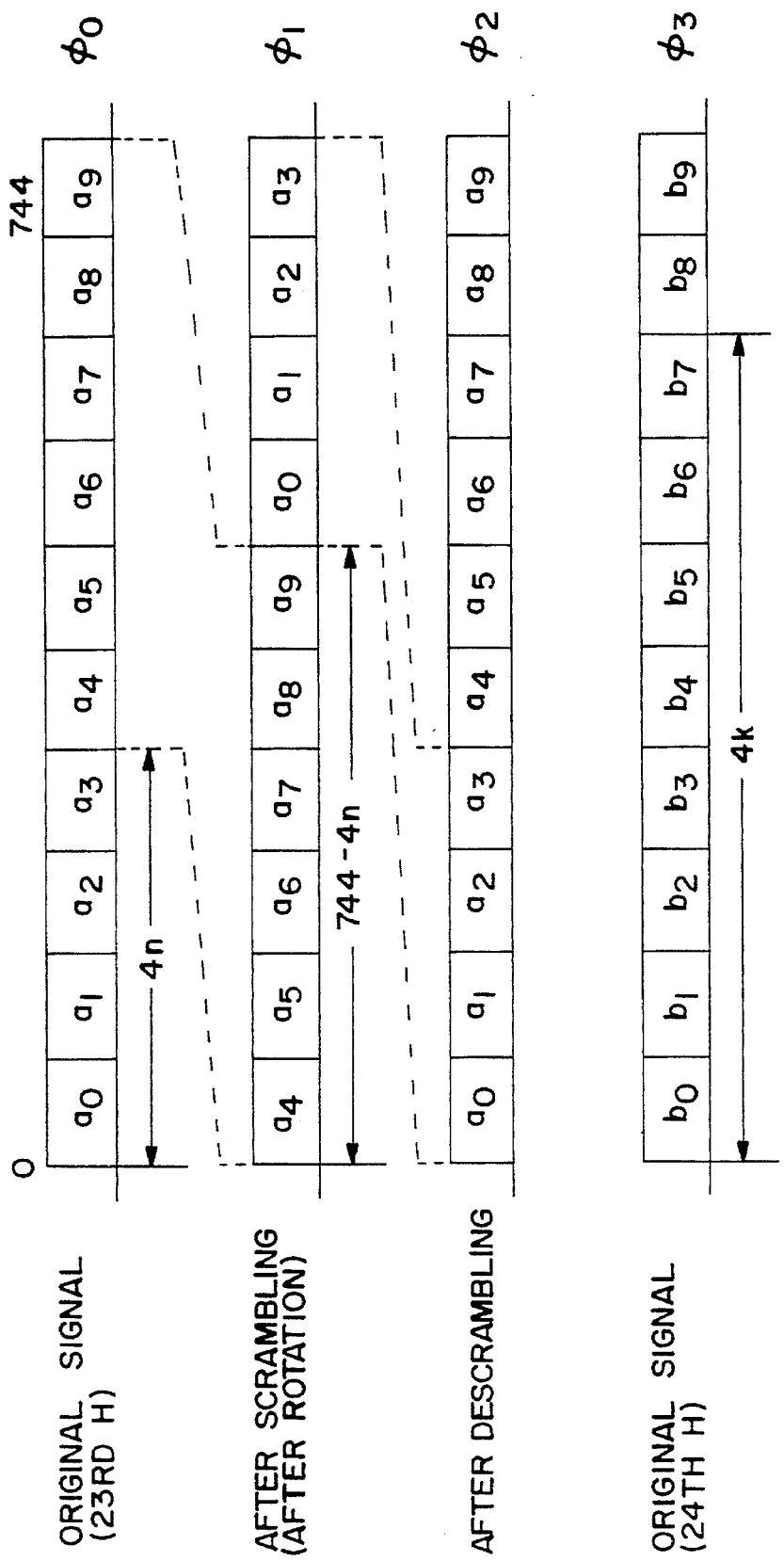
FIG. 7 is a diagrammatic representation of changes in the signal during one horizontal scan period in scrambling and descrambling.
Figure 8:
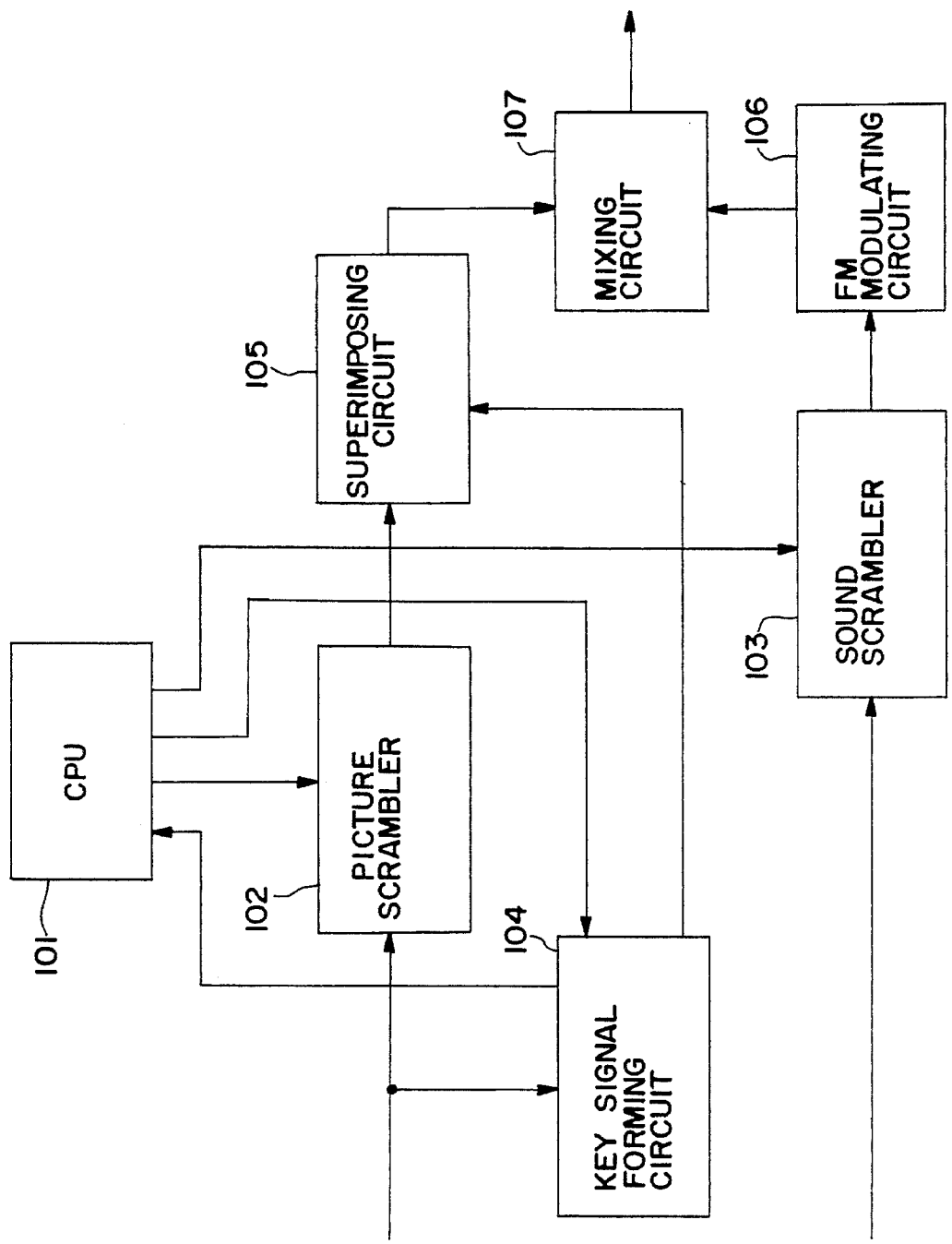
FIG. 8 is a block diagram showing the construction of the conventional scrambler.

Then, during the input of the 25th H signal to the terminal P1, the "original signal (24th H) $\phi3$" is read from the line memory 38. In this case, the output of the read address counter 33 is augmented as 4 k, 4 k+1 . . . as shown in FIG. 7. This is similar to the reading of 23rd H from the line memory 37. In other words, a line rotation has been applied with 4 k as the cut-point. In this manner, the picture signal from 23 H to 262 H of the field beginning at $t_{55}$ in FIG. 6 can be scrambled by applying line rotation to each of the horizontal scan lines.

The scramble trigger pulse is inserted in the 22nd H of the thus-scrambled picture signal. According to the teletext specification, this trigger signal permits superimposition of 296 bits of digital signal per H (one horizontal scanning period). When the leading 24 bits are used for the scramble trigger pulse, the remaining 272 bits can be used for data. When the same error correcting code as that for teletext is used, the available 192-bit data capacity is sufficient for the data used in a closed loop.

As mentioned hereinbefore, 8 bits of the output of the nonlinear feedback shift register 31 are used for the scramble cut-point of line rotation and that the cut-point is specified to be a maximum of 186 from the maximum address of the line memories. Thus, the relationship of the n and k which determines the cut-point of picture signal for each horizontal scan period (hereinafter referred to as 1 H) is nonlinear and cannot be predicted. To be specific, the read start address set on the read address counter 33 is shifted by a predetermined number of bits for each H and is not n but a different figure, viz. k. The number of bits by which this shift register is shifted per H is set at the stage of system design. Therefore, if n can be known, k cannot be known. Thus, by encoding the rotation cut-point, the picture signal can be subjected to elaborate security processing.

Meanwhile, the output of the 22 H inserting circuit 41 is fed to the message inserting circuit 42 for inserting a message data such as "the message containing the characters representing the machine no." shown in FIG. 5. The signal in which the message has been inserted is applied to the mixing circuit 44 where it is mixed with the 4.5 MHz sound signal output from the QPSK modulating circuit 61 to provide an NTSC-like signal. This signal is recorded by the picture and sound record/reproduction block 7 shown in FIG. 1. The thus-recorded picture and sound signals cannot be descrambled unless reproduced with a video recorder 3 incorporating a scramble codec having the same key data Ki.

While the scramble trigger pulse is generated once at start of recording, reproduction of the scrambled signal recorded in the picture and signal record/reproduction block 7 is not necessarily performed from the beginning. Therefore, it is recommendable to generate scramble trigger pulses in a predetermined cycle and superimpose them on the picture signal as mentioned hereinbefore. This can be easily accomplished by means of CPU 19. For example, the CPU 19 can be programmed so that the trigger generating circuit 17 will generate a scramble trigger every minute (1800 fields).

The operation of reading the scrambled signal from the picture and sound record/reproduction block 7 and descrambling it is now explained. The same scramble codec that was used for scrambling may be used for descrambling. Thus, for reproduction of the output of said picture and signal record/reproduction block 7, the switch 10 shown in FIG. 2 is switched to the same block 7 and the reproduction output is applied to the sync separator 11, $f_{sc}$ regenerating circuit 12, 22 H extraction circuit 13 and 22 H erase circuit 14. The reproduction signals at the picture and sound record/reproduction block 7 are now assumed to be the picture signal and the signal obtained by QPSK modulation of the 4.5 MHz carrier with 720 KHz. Since, in reproduction, the message data specifying the recording machine as shown in FIG. 5 is reproduced unscrambled for a predetermined initial time, reproduction needs the machine having the particular machine number.

In descrambling of the sound signal, the reproduced signal is amplified by the band-pass amplifier (BPA) 56 with a center frequency of 4.5 MHz (FIG. 4) and demodulated in a QPSK demodulating circuit 57 to provide a binary signal (bit stream) of 720K bps. As demodulation is commanded from the operating block 8, the output of the QPSK demodulating circuit 57 is transmitted from the CPU 19 through selector 55 to the EOR circuit 58. By adding to the scrambled bit stream the PN signal train added for scrambling and taking the exclusive logical sum as described hereinafter, there can be obtained a non-scrambled bit stream. The selector 59 is adapted to switch the input according to whether the signal has been scrambled or not and an unscrambled bit stream signal is available at its selected output terminal. This signal is demodulated in the PCM demodulating circuit 62 and outputted from the terminals P5, P6. When the addition period of the PN signal train cannot be directly designated with the CPU 19, the output of the clock pulse generating circuit 15 and the gate signal formed in CPU 19 are employed.

The formation of the PN signal train for use in this descrambling is now explained. First, from the picture signal applied to the terminal P1, the horizontal synchronizing signal of 22nd H is extracted in the 22 H extracting circuit 13 and the scramble trigger pulse is detected with the trigger pulse detection circuit 16. Since the signal of the same form as teletext is superimposed on the 22nd H signal, the clock pulse is also fed to the 22 H extracting circuit 13 as in the teletext receiver so as to read the 22 H scramble trigger signal. Then, starting from the sound scramble frame immediately following the time $t_{31}$ of scramble trigger pulse (if no sufficient time is available, with a delay of a predetermined number of sound frames), the key data Ki stored in the Ki memory 22 is supplied, as the initial value of the sound PN generating circuit 51, to the nonlinear feedback shift register 31 and sound PN generating circuit 51 just as in scrambling. Then, by the same procedure used for scrambling, the sound PN signal is generated. In this way, the sound signal can be descrambled. Thus, unfailing recording and reproduction with a high degree of security can be accomplished through the use of the same circuit structure and same procedure in both scrambling and descrambling.

The descrambling of the picture signal by such procedure is now explained. For return from the state shown at "$\phi_1$ after scrambling" to the state at "$\phi_2$ after descrambling" in FIG. 7, the read address counter 36 is initialized with (744−4 n) in time with the outputting of n from the nonlinear feedback shift register 31. The key for this may be in common with that for sound signal processing, and which portion (8 bits) of the nonlinear feedback shift register 31 is used can be determined at scrambling. For this purpose, the output of the MSB reversing circuit 45 is applied to an address setting circuit 46 by controlling the CPU 19. The address setting circuit 46 performs the operation of 744−4 n in descrambling and presets the result as the read address in the read address counter 36. As a result, as shown at "$\phi_2$ after descrambling" in FIG. 7, the 22nd H horizontal scan line is sequentially read from $a_0$ to $a_9$ as in the case of "original signal (23 H) $\phi_0$". During this time the line memory 38 is loaded with the rotated 24th H signal, viz. "original signal (24 H) $\phi_3$" and, here, the reading for descrambling can begin at 744−4K and proceed to $b_0$, $b_1$ . . . . On the other hand, the write address counter 32 is so set that the input is written as it is into the line memory 37 or 38 for each horizontal scan line. Therefore, no special processing for descrambling is required.

The picture signal of each horizontal scan line which is thus read is applied to the D/A converter 40 selected by the selector 39 and converted to an analog picture signal. Then, after insertion of the 22nd H line by the 22 H inserting circuit 41, the analog picture signal is mixed with the sound signal and the composite video signal is outputted. The descrambled signal can then be displayed on AVTV 9.

As described in detail hereinbefore, many of the circuits in the scramble codec 4 are simple in construction and may be used for scrambling and descrambling in common. Moreover, the majority may be are digital signal processing circuits and can therefore be easily integrated as an LSI. Excepting the sync separator 11, $f_{sc}$ regenerating circuit 12, 22 H inserting circuit 41, A/D converter 40, BPA 56, QPSK demodulating circuit 57, PCM demodulating circuit 62 and mixing circuit 44, the number of gates in this scramble codec 4 is 50 to 60 thousand which is the scale allowing integration in one chip. Moreover, as to the QPSK demodulating circuit 57 and PCM demodulating circuit 62, the BS tuner LSI can be modified so as to be compatible with both frequencies 2.048 MHz and 720 KHz. Thus, by integrating the major part of the scramble codec into one chip, the degree of security against tapping or other illegal acts is increased.

As has been described hereinabove, with the scramble codec of the present invention picture and sound signals can be easily scrambled and descrambled in the same circuitry. The circuitry of this scramble codec is very simple in construction and permits addition of the security processing function, at low cost, to the picture and sound record/reproduction equipment.

Furthermore, the provision of key data reduces the possibility of fabricating an identical device to substantial zero, for assuming that the key data Ki consists of 64 bits, the probability of appearance of the same Ki is approximately 1/1844. Thus, there can be implemented a video recorder with a remarkably high degree of security and substantially no chances for information decoding with other devices.

Furthermore, when message information, such as the "message containing characters representing the machine ID no." mentioned hereinbefore, is inserted in the picture signal to indicate the machine used for recording at the outset and in unscrambled state, there is obtained the effect that the device used can be easily ascertained without mistake.

What is claimed is:

1. A scramble codec for scrambling and descrambling television picture signals, said scramble codec comprising:

key data memory means for storing a key data value, line memory means in which a plurality of input picture signals are written, each one of said plurality of input picture signals corresponding to a respective one of a plurality of horizontal scan lines, register means, which is initialized with an output value generated by said key data memory means, for generating dissimilar pseudorandom pulse signals as output signals for respective ones of said plurality of horizontal scan lines, an address setting circuit which sets, as an initial value for scrambling, a respective first value corresponding to a respective output signal generated by said register means and, as an initial value for descrambling, a respective second value obtained by subjecting a further respective output signal generated by said register means from a maximum address value corresponding to said line memory means, address counter means for a) generating consecutive series of address values starting with an address set by said address setting circuit and b) applying said address values to said line memory means for respective horizontal scan lines, and means for scrambling the respective horizontal scan lines using said address values.

2. The scramble codec of claim 1 further comprising latch means which holds an ID number; and an EOR circuit which generates an exclusive logical sum of the ID number held by said latch means and the key data value stored in said key data memory means, wherein said register means is alternately initialized with the exclusive logical sum generated by said EOR circuit to output dissimilar pseudo-random pulses for respective horizontal scan lines.

3. The scramble codec of claim 2 further comprising input means for entering the ID number.

4. The scramble codec according to claim 1 further comprising:

message memory means for holding an intrinsic data value which specifies the video recorder as a picture data value and message inserting means for reading said intrinsic data value from said message memory means and inserts said intrinsic data value without scrambling, into the picture signal.

5. The scramble codec according to claim 1 wherein said register means includes a number of constituent bits and a feedback loop which are randomly set.

6. The scramble codec according to claim 1, wherein the scrambling means scrambles at least one horizontal scan line using rotation scrambling.

7. The scramble codec according to claim 3, wherein the scrambling means scrambles at least one horizontal scan line using rotation scrambling.

8. A scramble codec for scrambling and descrambling television picture signals, said scramble codec comprising:

key data memory means for storing a key data value, line memory means in which a plurality of input picture signals are written, each one of said plurality of input picture signals corresponding respective one of a plurality of horizontal scan lines independently, register means, which is initialized with an output value generated by said key data memory, for generating dissimilar pseudorandom pulse signals as output signals for respective ones of said plurality of lines, an address setting circuit which sets, as an initial value for scrambling, a respective first value obtained by subtracting a further respective output signal generated by said register means from a maximum address value corresponding to said line memory means and, as the initial value for descrambling, a respective second value corresponding to a respective output signal generated by said register means, address counter means for a) generating a consecutive series of address values starting with an address set by said address setting circuit and b) applying said address values to said line memory means for respective horizontal scan lines, and means for scrambling the respective horizontal scan lines using said address values.

9. The scramble codec according to claim 8 further comprising:

message memory means for holding an intrinsic data value which specifies the video recorder as a picture data value and message inserting means for reading said intrinsic data value from said message memory means and inserts said intrinsic data value without scrambling, into the picture signal.

10. The scramble codec according to claim 8 wherein said register means includes a number of constituent bits and a feedback loop which are randomly set.

11. A scramble codec for scrambling and descrambling television sound signals, said scramble codec comprising:

conversion means for converting an input analog sound signal to a serial bit stream signal during scrambling and producing an output conversion signal, demodulating means for demodulating a sound signal from a composite video signal during descrambling to provide a bit stream and produce an output demodulating signal, sound PN generating means for generating a plurality of audio pseudorandom pulse signals to produce an output pseudorandom signal, first selector means for selecting (1) said output conversion signal during scrambling and (2) said output demodulating signal during descrambling, to produce a first selector signal, first EOR means for generating an exclusive logical sum of said output pseudorandom signal and said first selector signal, to produce an EOR signal, second selector means for selecting said EOR means and said first selector signal in response to one of scrambling and descrambling, to produce a second selector signal, modulating means for modulating said first EOR signal during scrambling to produce a modulated signal, mixing means for mixing the modulated signal with a picture signal, and PCM demodulating means for demodulating said second selector signal into analog signals.

12. The scramble codec or claim 11 further comprising nonvolatile key data memory means for storing a key data value, said sound PN generating circuit being initialized with said key data value stored in said key data memory means.

13. The scramble codec of claim 11 further comprising latch means which holds an ID number; nonvolatile key data memory means for storing a key data value;

a second EOR circuit which generates an exclusive logical sum of the ID number held by said latch means and the key data value stored in memory means, said sound PN generating circuit being initialized with said exclusive logical sum generated by said second EOR circuit to generate an audio pseudorandom pulse signal.

14. The scramble codec of claim 13 further comprising input means for entering said ID number.

15. The scramble codec according to claim 11 further comprising:

message memory means for holding an intrinsic data value which specifies the video recorder as a picture data value and message inserting means for reading said intrinsic data value from said message memory means and inserts said intrinsic data value without scrambling, into the picture signal.

16. The scramble codec according to claim 11 wherein said register means includes a number of constituent bits and a feedback loop which are randomly set.

17. A scramble codec for scrambling and descrambling television pictures and television sound signals, said scramble codec comprising:

key data memory means for storing a key data value, line memory means in which a plurality of input picture signals are written, each one of said plurality of input picture signals corresponding to a respective one of a plurality of horizontal scan lines, register means, which is initialized with an output value generated by said key data memory means, for generating dissimilar pseudorandom pulse signals as output signals for respective ones of said plurality of horizontal scan lines, an address setting circuit which sets, as an initial value for scrambling, a respective first value corresponding to a respective output signal generated by said register means and, as the initial value for descrambling, a respective second value obtained by substracting a further respective output signal generated by said register means from a maximum address value corresponding to said line memory means, address counter means for a) generating series of read address values starting with an address set by said address setting circuit and b) applying said address values to said line memory means for respective horizontal scan lines, means for scrambling the respective horizontal scan lines using said address values, conversion means for converting an input analog sound signal to a serial bit stream signal during scrambling, demodulating means for demodulating a sound signal from a composite video signal during descrambling to provide a bit stream, sound PN generating means for generating a plurality of audio pseudorandom pulse signal, first EOR means for generating an exclusive logical sum of said plurality of audio pseudorandom pulse signals and said bit stream, QPSK modulating means for modulating the exclusive logical sum generated by said first EOR circuit during scrambling to generate a modulated signal, mixing means for mixing the signal modulated by said QPSK modulating means with the television picture signals and PCM demodulating means for demodulating said exclusive logical sum generated by said first EOR circuit to the television sound signals during descrambling.

18. The scramble codec of claim 17 wherein said sound PN generating circuit is initialized with said key data value stored in said key data memory means.

19. The scramble codec of claim 17 further comprising latch means for hold an ID number and second EOR means for generating an exclusive logical sum of the ID number held by said latch means and said key data value stored in said key data memory means, said register means being initialized with said exclusive logical sum generated by said second EOR to generate dissimilar pseudorandom pulse signals for respective horizontal scan lines and said sound PN generating circuit being initialized with said exclusive logical sum generated by second EOR circuit to generate pseudorandom pulse signals for the input analog sound signal.

20. The scramble codec of claim 19 further comprising input means for entering an ID number.

21. The scramble codec according to claim 17 further comprising:

message memory means for holding an intrinsic data value which specifies the video recorder as a picture data value and message inserting means for reading said intrinsic data value from said message memory means and inserts said intrinsic data value without scrambling, into the picture signal.

22. The scramble codec according to claim 17 wherein said register means includes a number of constituent bits and a feedback loop which are randomly set.

23. The scramble codec according to claim 17, wherein the scrambling means scrambles at least one horizontal scan line using rotation scrambling.

24. A scramble codec for scrambling and descrambling television picture and sound signals, said scramble codec comprising key data memory means for storing a key data value, line memory means in which a plurality of input picture signals are written, each one of said plurality of input picture signals corresponding to a respective one of a plurality of horizontal scan lines, register means, which is initialized with an output value generated by the key data memory means, for generating dissimilar pseudorandom pulse signals as output signals for respective ones of said plurality of horizontal scan lines, an address setting circuit which sets, as an initial value for scrambling, a respective value first obtained by subtracting a further respective output signal generated by said register means from a maximum address value corresponding to said line memory means and, as an initial value for descrambling, a respective second value corresponding to a respective output signal generated by said register means, address counter means for a) generating a consecutive series of address values starting with an address set by said address setting circuit and b) applying said address values to said line memory means for respective horizontal scan lines, means for scrambling the respective horizontal scan lines using said address values, conversion means for converting an input analog sound signal to a serial bit stream signal during scrambling, demodulating means for demodulating a sound signal from a composite video signal during descrambling to provide a bit stream, sound PN generating means for generating a plurality of audio pseudorandom pulse signals, first EOR means for generating an exclusive logical sum of said plurality of audio pseudorandom pulse signals and said bit stream, modulating means for modulating said logical sum generated by said first EOR means during scrambling to produce a modulated signal, mixing means for mixing the modulated signal with a picture signal, and PCM demodulating means for demodulating said logical sum generated by said first EOR means to generate said input analog sound signal.

25. The scramble codec according to claim 24 further comprising:

message memory means for holding an intrinsic data value which specifies the video recorder as a picture data value and message inserting means for reading said intrinsic data value from said message memory means and inserts said intrinsic data value without scrambling, into the picture signal.

26. The scramble codec according to claim 24 wherein said register means includes a number of constituent bits and a feedback loop which are randomly set.

27. The scramble codec according to claim 24, wherein the scrambling means scrambles at least one horizontal scan line using rotation scrambling.

* * * * *